Figure 1:
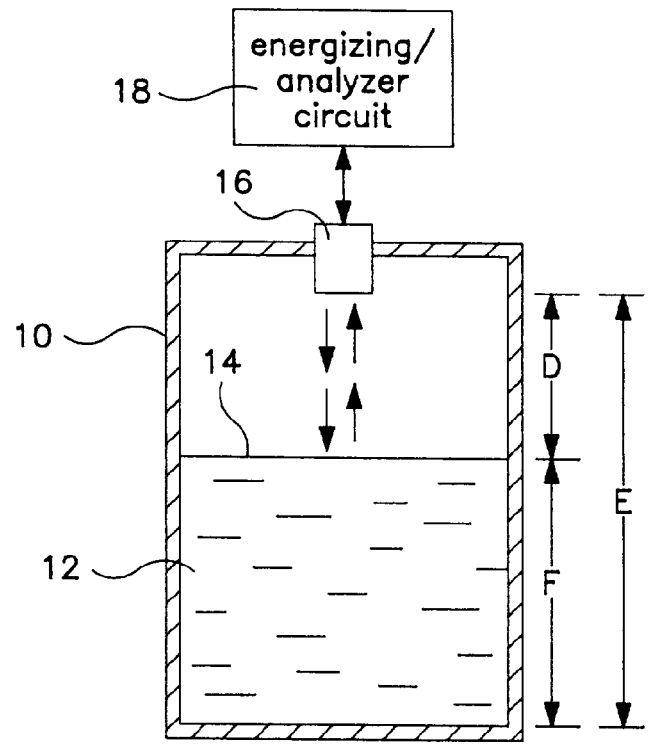

United States Patent
Getman et al.

[11] Patent Number: 6,142,015
[45] Date of Patent: Nov. 7, 2000

[54] METHOD AND ASSEMBLY FOR OVERFILL DETECTION IN LIQUID LEVEL SENSING IN A VESSEL BY THE PULSE TRANSIT TIME TECHNIQUE

[75] Inventors: Igor Getman; Sergej Lopatin, both of Lörrach; Roland Müller, Steinen, all of Germany

[73] Assignee: Endress + Hauser GmbH + Co., Maulburg, Germany

[21] Appl. No.: 09/055,636

[22] Filed: Apr. 6, 1998

[30]  Foreign Application Priority Data

Apr. 10, 1997 [DE]  Germany .............................. 197 14 973

[51] Int. Cl.[7] .............................. G01F 23/00; G01S 9/68
[52] U.S. Cl. ...................... 73/290 V; 73/861.27; 340/621
[58] Field of Search ........................... 73/290 V, 861.27; 340/621, 618; 367/908

[56]  References Cited

U.S. PATENT DOCUMENTS

| | | | |
|---|---|---|---|
| 1,956,920 | 5/1934 | Haltmeier | 73/290 V |
| 4,540,981 | 9/1985 | Lapetina et al. | 340/618 |
| 4,594,584 | 6/1986 | Pfeiffer et al. | 340/620 |
| 4,675,854 | 6/1987 | Lau . | |
| 4,679,160 | 7/1987 | Whitener . | |
| 4,700,569 | 10/1987 | Michalski et al. . | |
| 4,785,664 | 11/1988 | Reebs | 73/290 V |
| 5,103,728 | 4/1992 | Barney . | |
| 5,319,972 | 6/1994 | Oblak et al. . | |
| 5,578,994 | 11/1996 | Cherek et al. | 340/618 |
| 5,664,456 | 9/1997 | Eckert . | |
| 5,737,963 | 4/1998 | Eckert et al. . | |

FOREIGN PATENT DOCUMENTS

| | | |
|---|---|---|
| 2187839 | 4/1997 | Canada . |
| 0 459 755 | 12/1991 | European Pat. Off. . |
| 0 766 070 | 4/1997 | European Pat. Off. . |
| 0 766 071 | 4/1997 | European Pat. Off. . |
| 0 769 682 | 4/1997 | European Pat. Off. . |
| 30 32 177 | 3/1982 | Germany . |
| 33 39 984 | 5/1985 | Germany . |
| 34 38 045 | 5/1985 | Germany . |
| 43 20 411 C1 | 8/1994 | Germany . |
| 1 473 840 | 5/1977 | United Kingdom . |

*Primary Examiner*—Hezron Williams
*Assistant Examiner*—Michael Cygan
*Attorney, Agent, or Firm*—Bose McKinney & Evans LLP

[57]  ABSTRACT

Sensing the level of a liquid in a vessel by the pulse transit time technique is done by means of an ultrasonic transducer mounted above the highest-permissible level in the vessel which emits ultrasonic transmission pulses to the surface of the liquid and receives the ultrasonic echo pulses reflected from the liquid surface. The level in the vessel is established from the transit time of the ultrasonic pulses. To detect an overfill when the ultrasonic transducer is immersed in the liquid the decaying output signal of the ultrasonic transducer generated by the ringing of the ultrasonic transducer following the end of the each ultrasonic transmission pulse is analyzed. In this arrangement the fact is exploited that due to the better coupling of the ultrasonic transducer to the liquid than to air the ringing duration is shorter when the ultrasonic transducer is covered by the liquid.

17 Claims, 2 Drawing Sheets

METHOD AND ASSEMBLY FOR OVERFILL DETECTION IN LIQUID LEVEL SENSING IN A VESSEL BY THE PULSE TRANSIT TIME TECHNIQUE

The invention relates to a method for overfill detection in liquid level sensing in a vessel by the pulse transit time technique by means of an ultrasonic transducer mounted above the highest-permissible level in the vessel and configured so that when it is energized by an alternating voltage pulse it emits during a transmitting time interval an ultrasonic transmission pulse to the surface of the liquid and receives in a receiving time interval subsequent to the transmitting time interval the ultrasonic echo pulse reflected from the liquid surface and converts it into an electrical detection signal which is output at the terminals of the ultrasonic transducer, the level in the vessel being detected from the transit time of the ultrasonic pulses from the point in time of emittance of the ultrasonic transmission pulse to the point in time of detecting the ultrasonic echo pulse.

The invention relates furthermore to an assembly for implementing the method.

A method of this kind is known, for example, from DE 34 38 045 C2. In this document it is also explained that the ultrasonic transmission pulse generated by the ultrasonic transducer does not instantly cease at the end of the energizing alternating voltage pulse, it instead decaying with a gradually diminishing amplitude due to "ringing" of the ultrasonic transducer. This phenomenon results more particularly in echo pulses still arriving within the ringing time from a very short distance away failing to be analyzed. Accordingly, by this method an overfill condition in which the level in the vessel has attained the ultrasonic transducer cannot be registered, an additional sensor as a kind of level limit switch needing to be applied to the vessel to signal such an overfill.

The object of the invention is to define a method in which in sensing a liquid level by the pulse transit time technique an overfill can be detected without an additional sensor.

This object is achieved in accordance with the invention in that the decaying output signal generated by the ringing of the ultrasonic transducer after the end of the alternating voltage pulse is analyzed to determine whether the ultrasonic transducer is covered by the liquid or not.

The gist of the method in accordance with the invention is based on the fact that the ringing of the ultrasonic transducer decays substantially faster due to the better coupling to liquids when the ultrasonic transducer is immersed in a liquid than when vibrating in air. The speed of decay can be established in various ways.

One way consists of comparing the ringing duration of the ultrasonic transducer up to decay to a predetermined amplitude value to a predetermined time limit value which is dimensioned so that it is fallen short of when the ultrasonic transducer is covered by the liquid.

A second way is to compare the ringing amplitude of the output signal of the ultrasonic transducer at a predetermined point in time after the end of the alternating voltage pulse to a predetermined threshold value which is dimensioned so that it is fallen short of when the ultrasonic transducer is covered by the liquid.

A third way involves integrating the ringing amplitude of the output signal of the ultrasonic transducer in a predetermined time window after the end of the alternating voltage pulse and comparing the integration value to a predetermined threshold value which is dimensioned so that it is fallen short of when the ultrasonic transducer is covered by the liquid.

In any case the decaying output signal generated by the ringing of the ultrasonic transducer which is a nuisance in level sensing according to the pulse transit time technique is made use of to detect an overfill. This necessitates no additional sensor but merely an additional means of processing the signal in the energizing/analyzer circuit which can be implemented by a minor circuit addition. The particular advantage of this solution is that no change needs to be made to the vessel itself.

An assembly for implementing the aforementioned method comprising an ultrasonic transducer mounted above the highest-permissible level in the vessel and configured so that when it is energized by an alternating voltage pulse it emits during a transmitting time interval an ultrasonic transmission pulse to the surface of the liquid and receives in a receiving time interval subsequent to the transmitting time interval the ultrasonic echo pulse reflected from the liquid surface and converts it into an electrical detection signal which is output at the terminals of the ultrasonic transducer, and an energizing/analyzer circuit containing a transmission pulse generator for applying an alternating voltage pulse to the ultrasonic transducer in every transmitting time interval and a sensing circuit for sensing the transit time of the ultrasonic pulses from the electrical detection signals furnished by the ultrasonic transducer and for calculating the level from the sensed transit time is characterized in accordance with the invention by the energizing/analyzer circuit containing a test circuit which analyzes the decaying ultrasonic transducer output signal generated by the ringing of the ultrasonic transducer after the end of the alternating voltage pulse to determine whether the ultrasonic transducer is covered by the liquid or not.

Advantagous aspects and further embodiments of the assembly in accordance with the invention read from the sub-claims.

Figure 2:
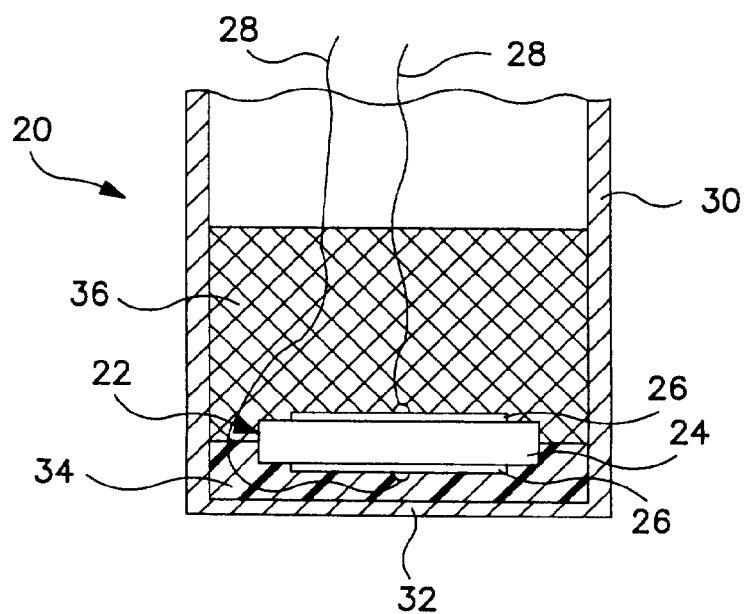
Figure 3:
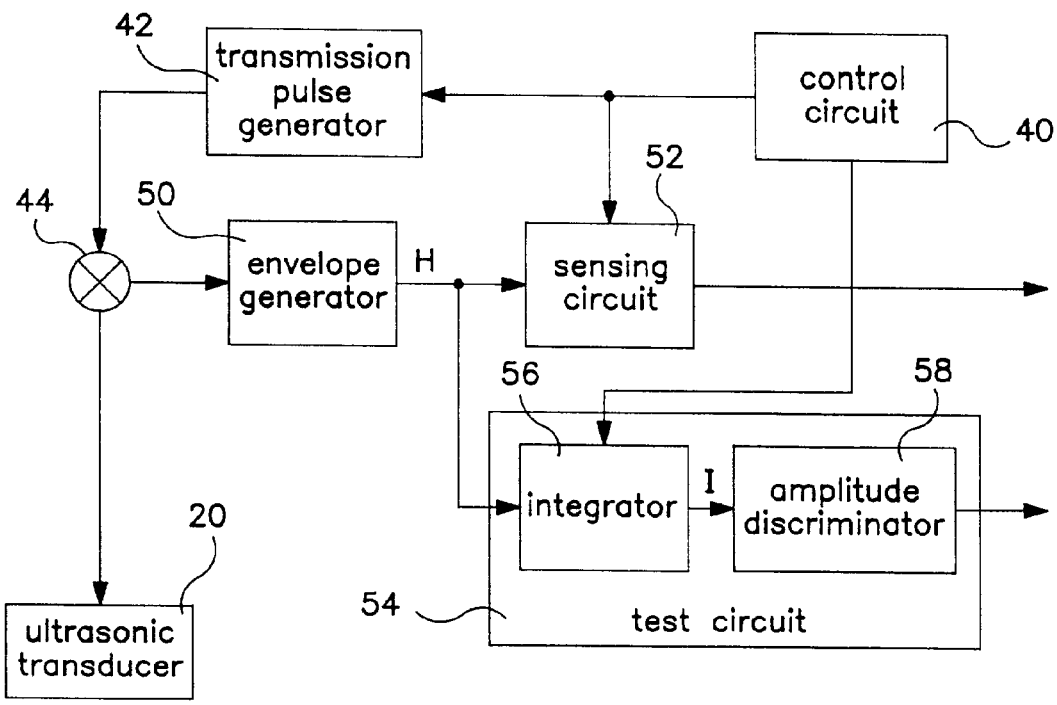
Figure 4A:
Figure 4B:
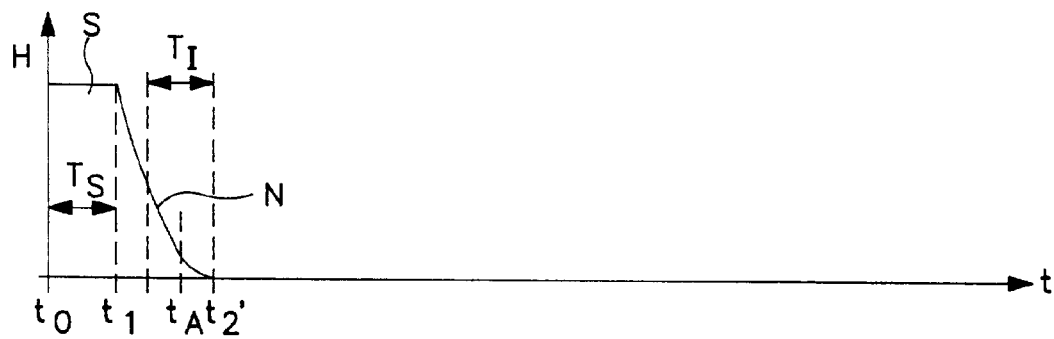

Further features and advantages of the invention will be appreciated from the following description of an example embodiment with reference to the drawing in which:

FIG. 1 is a schematic representation of an assembly for level sensing by the pulse transit time technique, FIG. 2 is a section view of a piezoelectric ultrasonic transducer which may be employed in the assembly as shown in FIG. 1, FIG. 3 is a block diagram of an embodiment of the energizing/analyzer circuit in the assembly as shown in FIG. 1, and FIG. 4A illustrates an envelope of the signals when the sensor is not immersed in the liquid, and FIG. 4B illustrates an envelope of the signals when the sensor is immersed in the liquid.

Referring now to FIG. 1 there is illustrated a vessel 10 which is filled with a liquid up to a level F. The level F at which the surface 14 of the liquid 12 exists above the bottom of the vessel 10 is the momentary level in the vessel. For sensing the level a sensor 16 is applied to the top of the vessel 10, this sensor being configured so that it is capable of emitting ultrasonic pulses to the surface of the liquid 12 and receiving the echo pulses reflected from the liquid surface 14. The sensor 16 is connected to an energizing/analyzer circuit 18 which applies an electrical alternating voltage pulse to the sensor 16 in predetermined transmission time intervals, as a result of which the sensor is caused to emit an ultrasonic transmission pulse. In a receiving time interval subsequent to each transmission time interval the sensor 16 converts the arriving ultrasonic signals into electrical alternating voltage signals which are applied to the energizing/analyzer circuit 18. Belonging to these received ultrasonic signals, more particularly is the ultrasonic echo pulse reflected by the liquid surface. The energizing/analyzer circuit 18 senses the transit time of the ultrasonic pulses from the sensor 16 to the surface of the liquid 14 and back to the sensor 16 which is equivalent to the interval in time between emission of a transmission pulse and reception of the echo pulse reflected from the liquid surface. From the sensed pulse transit time and the known speed of sound in air the energizing/analyzer circuit 16 calculates the distance between the sensor 16 and the liquid surface 14. The level F to be sensed results from the difference between the known installation level E of the sensor above the bottom of the vessel and the distance D. Sensing the level in this way in a vessel by the pulse transit time technique is known in general.

The sensor 16 contains as its salient component an ultrasonic transducer which is capable of converting an electrical alternating voltage signal into an ultrasonic signal, and vice-versa, an ultrasonic signal into an electrical alternating voltage signal. The ultrasonic transducer is caused to vibrate mechanically at its natural resonance frequency by application of an electrical alternating voltage, the frequency of which preferably corresponds to the natural resonance frequency of the ultrasonic transducer, to its terminals, it transmitting these vibrations to a surrounding medium in which the vibrations are propagated as ultrasonic waves. When, vice-versa, ultrasonic waves having a natural resonance frequency of the ultrasonic transducer are transmitted from the surrounding medium to the ultrasonic transducer the latter is caused to vibrate mechanically at its natural resonance frequency as a result of which an alternating voltage is generated which is output at the terminals.

Ultrasonic transducers usually have the following property: once they have been caused to vibrate mechanically at the natural resonance frequency by application of an electrical alternating voltage pulse, these vibrations fail to instantly cease at the end of the electrical alternating voltage pulse they instead gradually decaying. This "ringing" also prompts an electrical alternating voltage to be generated which appears at the terminals. Thus, when the liquid surface 14 is so near to the sensor 16 that the echo pulse reflected by the liquid surface 14 arrives at the sensor 16 when ringing is still going on, the echo pulse cannot be distinguished—or only with difficulty—from the alternating voltage signal generated by the ringing. This is why as a rule it is prescribed that the maximum level in the vessel must maintain a minimum distance away from the sensor; this minimum distance being termed the "block distance". When the maximum level is exceeded an overfill exists and special precautions need to be taken to "see" this overfill.

The problems as discussed above apply also to piezoelectric ultrasonic transducers as employed preferably nowadays. Referring now to FIG. 2 there is illustrated the usual configuration of one such piezoelectric ultrasonic transducer 20 in a section view. It contains a piezoelectric vibrator 22 formed by a slice 24 of a piezo-crystal 26 serving as electrodes connected by leads 28 to the energizing/analyzer circuit 18. The piezoelectric vibrator 22 is accommodated in a housing 30 of metal or a plastics material, the bottom 32 of which is configured as a diaphragm. Inserted between the piezoelectric vibrator 22 and the diaphragm 32 is an adapter film 34 of a plastics material serving the purpose of adapting the acoustic impedance of the piezoelectric vibrator 22 to the impedance of the transmission medium. The plastics material comprising the adapter film may be, for example, silicone. On the side of the piezoelectric vibrator 22 facing away from the diaphragm 32 the interior of the housing 30 is filled fully or partly with a potting compound 36, the purpose of which is to absorb or damp the ultrasonic waves emitted to this side.

When via these leads 28 an alternating voltage is applied to the electrodes 26 the piezoelectric crystal slice 24 is caused to mechanically resonate at one of its resonance frequencies, These mechanical resonance vibrations may be thickness vibrations or radial vibrations which are transmitted via the adapter film 34 to the diaphragm 32 and emitted from the latter as ultrasonic waves. When, vice-versa, ultrasonic waves arrive at the diaphragm 32 the latter is caused to vibrate mechanically, these vibrations being transmitted via the adapter film 34 onto the piezo-crystal slice 24 which is thereby caused to resonate mechanically. Due to these resonance vibrations an electrical alternating voltage is generated between the electrodes 26 which is transmitted to the energizing/analyzer circuit via the leads 28.

Referring now to FIG. 3 there is illustrated a simplified block diagram of the energizing/analyzer circuit 18. The ultrasonic transducer 20 is represented symbolically by a circuit block. A control circuit 40 controls all functions of the various circuit components. More particularly, the control circuit 40 furnishes periodic trigger pulses to a transmission pulse generator 42 which emits an electrical alternating voltage pulse having the frequency of the ultrasonic wave to be emitted, every time it is triggered. The ouput of the transmission pulse generator 42 is connected to a diplexer 44 via which the alternating voltage pulse is applied to the ultrasonic transducer 20.

At the receiving end the ultrasonic transducer 20 is connected via the diplexer 44 to the input of an envelope circuit 50 which outputs an envelope signal H corresponding to the envelope of all alternating voltage signals output by the ultrasonic transducer 20. The envelope signal H is applied to the input of a sensing circuit 52 which on the one hand receives the transmission pulse dictating the point in time of emission from the control circuit 40. The sensing circuit 52 establishes from the envelope signal H the echo pulse having been reflected by the liquid surface 14 and it measures the interval in time between the point in time of emission and the point in time of arrival of the echo pulse. It is from this interval in time that the sensing circuit 52 is able to compute the level F, as explained above.

Referring now to plot A in FIG. 4 there is illustrated the envelope of the signals in the assembly as shown in FIG. 3 for the case of the level sensing as just explained above. The square pulse S is the envelope of the alternating voltage pulse applied by the transmission pulse generator 42 to the ultrasonic transducer 20, commencing at the point in time $t_0$ and ending at the point in time $t_1$. The duration $T_S$ from the point in time $t_0$ to the point in time $t_1$ is the transmission time interval. The ultrasonic transmission pulse generated by the ultrasonic transducer 20 does not end abruptly at the point in time $t_1$, however, it instead gradially decaying due to the ringing of the piezo-crystal as is evident from the decay in the section N of the curve so that it does not end until the point in time $t_2$. The ringing duration from $t_1$ to $t_2$ corresponds substantially to the block distance. It is relatively long because the ultrasonic transducer 20 vibrates in air and despite the adapter film 34 the coupling of the piezo-crystal 24 to air is poor so that the vibration energy is extracted from the piezo-crystal only slowly.

At the point in time $t_E$ the echo pulse E reflected from the liquid surface 14 appears in the envelope signal H. The sensing circuit 52 detects the interval between the point in time of emission $t_0$ and the point in time of reception $t_E$ and computes therefrom the level F.

Referring now to plot B in FIG. 4 there is illustrated the envelope of the signals in the case of an overfill in which the sensor 16 is immersed in the liquid at least by its diaphragm 32. In this case, of course, no further echo pulse is received. Furthermore, the shape of the ultrasonic transmission pulse has changed, it now decaying very much quicker due to the vibration energy being extracted from the piezo-crystal 24 faster because of the better coupling to the liquid. As a result of this the section N of the curve caused by the ringing drops off steeper and the point in time $t_2'$ at which the ringing duration is terminated is located nearer to the point in time of emission t0 than the point in time $t_2$ in the case of plot A.

This changed shape in the curve is utilized to detect an overfill, this being done in the assembly as shown in FIG. 3 by a test circuit 54 connected in parallel to the sensing circuit 52 at the ouput of the envelope generator 50. Detecting the overfill may be done in various ways.

One way is to measure the ringing duration which in the case of plot A is substantially longer than in the case of plot B. Since it is difficult to determine the precise end point in time $t_2$ or $t_2'$ of the ringing duration, the duration is measured up to a point in time at which the ringing amplitude has dropped to a predetermined value. However, sensing the time is relatively complicated.

Another way is to measure the ringing amplitude at a specific point in time subsequent to the point in time of emission $t_0$. Comparing plots A and B shows that at the same point in time $t_A$ the amplitude of the decayed ringing is substantially larger in the case of plot A than in the case of plot B. This larger amplitude indicates that no overfill exists, whilst the smaller amplitude indicates that an overfill exists. When detecting the overfill in this way, however, there is the risk that sporadic noise pulses in which the amplitude to be sensed is buried result in a false indication.

This is why in the assembly as shown in FIG. 3 a third method is put to use in which the integral over the ringing amplitude is formed in a time window $T_I$ located subsequent to the transmission time interval $T_S$. For this purpose the test circuit 54 is provided with an integral 56 to which the output signal of the envelope generator 50 is applied. The control circuit 40 applies a control signal to a control input of the integrator 44, this control signal activating the integrator 56 for the duration of the time window $T_I$. The integrator 56 outputs a signal I which is proportional to the integral of the ringing amplitude over the time window $T_I$. The signal I is applied to an amplitude discriminator 58, the output signal of which assumes a first state in which the signal I is below a predetermined threshold value, it assuming a second state, however, when the signal I exceeds the threshold value. The first state of the output signal of the amplitude discriminator 56 indicates an overfill whilst the second state indicates that no overfill exists.

Integrating the envelope signal in the time window $T_I$ enhances the reliability quite considerably in sensing an overfill as compared to simply sampling at a point in time $t_A$, it being evident from a comparison of the plots A and B in FIG. 4 that the integral of the envelope signal is greater than in the case of plot B even if in the latter case sporadic noise were to occur in the time window $T_I$.

The assembly as evident from FIG. 3 can, however, be easily modified in case the ringing amplitude is sampled at a specific point in time $t_A$. For this purpose the integrator 56 is simply replaced by a sampling circuit which is controlled by the control circuit 40 so that it samples the ringing amplitude at the point in time $t_A$. The sampled value is then compared to a corresponding threshold value in the amplitude discriminator 58.

Each of the methods of analysis as described above for detecting an overfill is based on the differing acoustic adaptation between the piezo-crystal used in each case and the media to which the acoustic energy is to be dissipated, i.e. in this case air, on the one hand, and liquid on the other. When the acoustic impedance of the adapter film is designated $Z_A$, the acoustic impedance of the medium (air or liquid) $Z_M$ and the acoustic impedance of the piezo-crystal $Z_p$, then for achieving a good acoustic adptation the acoustic impedance $Z_A$ of the adapter film needs to satisfy the following equation:

$$Z_A = (Z_M \cdot Z_p)^{1/2}$$

The acoustic impedance $Z_p$ of conventional piezo-crystals as normally used for piezoelectric ultrasonic transducers, such as lead zirconate titanate (PZT) amounts to approx. $1.5 \cdot 10^6$ and the acoustic impedance $Z_A$ of conventional plastics materials suitable for the adapter film is in the range $1.5 \cdot 10^6$ to $4.2 \cdot 10^6$. Since the acoustic impedance $Z_A$ of air is $0.0005 \cdot 10^6$ it is obvious that a good acoustic impedance in air is not possible. Although it is likewise not possible to achieve with the available adapter film materials an optimum adaptation of conventional piezo-crystals to the liquid, for example to water having an acoustic impedance of $1.5 \cdot 10^6$, adaptation to liquids is nevertheless considerably better than to air, this being evident from the difference in the ringing response of the piezovibrator illustrated in the plots A and B of FIG. 4 as exploited in detecting an overfill. This difference becomes all the more evident, the better the adaptation between the piezo-crystal and the liquid, since ringing of the piezovibrator decays quicker the more the ultrasonic transducer is immersed in the liquid. Accordingly, for detecting an overfill as described, adaptation of the piezo-crystal to the liquid is to be attained as best possible.

Adapting the piezo-crystal to the liquid can be substantially improved by using a piezoelectric transducer, the piezo-crystal of which consists of a porous piezoelectric ceramic having the connectivity 3—3.

The term "connectivity" was introduced by R. E. Newnham to characterize the structures of multi-phase solids as also applied to composite electroceramics (R. E. Newnham "Composite Electroceramics, Ferroelectrics 1986, Vol. 86, pages 1–32). The connectivity designates the spatial directions in a three-dimensional right-angled system of coordinates in which the components of each phase are fully connected to each other, 0 meaning that the components of each phase are fully connected to each other in no spatial direction, 1 that the components of each phase are fully connected to each other in only one spatial direction, and so on. Thus "connectivity 3—3" means that in the case of a two-phase solid the components of each of the two phases are fully connected to each other in all three spatial directions.

In the paper "Dielectric, elastic and piezoelectric properties of porous PZT ceramics" by W. Wersing, K. Lubitz and J Mohaupt in Ferroelectrics 1986, Vol. 68, pages 77–97 the term connectivity is also applied to porous ceramics which are viewed as being two-phase solids in which the one phase is formed by the ceramic material and the other phase by the pores. Thus, in the case of a porous ceramic having the connectivity 3—3 both the ceramic material and the pores are fully connected to each other in all three spatial directions.

For piezo-crystals of such a porous ceramic the equation as cited above can be satisfied approximately so that the adaptation to the liquid is even better than for conventional piezo-crystals. Accordingly, the ringing duration of such piezo-crystals in the immersed condition—as evident in plot B of FIG. 4—is again significantly shorter than the ringing duration of conventional piezo-crystals. As compared to this, adapting piezo-crystals of porous ceramic to air results in no substantial difference to that of conventional piezo-crystals. Thus when using piezoelectric ultrasonic transducers, the piezo-crystal of which consists of porous ceramic having the connectivity 3—3, detecting an overfill is made even easier and more reliable due to the difference in the ringing duration.

What is claimed is:

1. A method for overfill detection in liquid level sensing in a vessel by the pulse transit time technique by means of an ultrasonic transducer having terminals mounted above the highest-permissible level in the vessel and configured so that when said ultrasonic transducer is energized by an alternating voltage pulse it emits during a transmitting time interval an ultrasonic transmission pulse to the surface of the liquid and receives in a receiving time interval subsequent to the transmitting time interval an ultrasonic echo pulse reflected from the liquid surface and converts said ultrasonic echo pulse into an electrical detection signal which is output at the terminals of said ultrasonic transducer, the level in said vessel being detected from said transit time of said ultrasonic pulses from the point in time of emittance of said ultrasonic transmission pulse to the point in time of detecting said ultrasonic echo pulse wherein the decaying ultrasonic transducer output signal generated by the ringing of said ultrasonic transducer after the end of said alternating voltage pulse is analyzed to determine whether said ultrasonic transducer is covered by said liquid.

2. The method as set forth in claim 1, wherein the ringing duration of said ultrasonic transducer up to decay to a predetermined amplitude value is compared to a predetermined time limit value which is dimensioned so that it is fallen short of when said ultrasonic transducer is covered by said liquid.

3. The method as set forth in claim 1 wherein said ringing amplitude of said output signal of said ultrasonic transducer at a predetermined point in time after the end of said alternating voltage pulse is compared to a predetermined threshold value which is dimensioned so that it is fallen short of when said ultrasonic transducer is covered by said liquid.

4. The method as set forth in claim 1 wherein said ringing amplitude of said output signal of said ultrasonic transducer is integrated in a predetermined time window after the end of said alternating voltage pulse and said integration value is compared to a predetermined threshold value which is dimensioned so that it is fallen short of when said ultrasonic transducer is covered by said liquid.

5. An assembly for overfill detection in liquid level sensing by the pulse transit time technique comprising an ultrasonic transducer mounted above a highest-permissible level in a vessel, said ultrasonic transducer having terminals, and configured so that when said ultrasonic transducer is energized by an alternating voltage pulse it emits during a transmitting time interval an ultrasonic transmission pulse to a surface of a liquid and receives in a receiving time interval subsequent to said transmitting time interval an ultrasonic echo pulse reflected from said liquid surface and converts it into an electrical detection signal which is output at said terminals of said ultrasonic transducer, and an energizing/analyzer circuit containing a transmission pulse generator for applying an alternating voltage pulse to said ultrasonic transducer in every transmitting time interval, and a sensing circuit for sensing the transit time of said ultrasonic pulses from said electrical detection signals furnished by said ultrasonic transducer and for calculating said level from said sensed transit time wherein said energizing/analyzer circuit contains a test circuit which analyzes said decaying ultrasonic transducer output signal generated by ringing of said ultrasonic transducer after the end of said alternating voltage pulse to determine whether said ultrasonic transducer is covered by said liquid.

6. The assembly as set forth in claim 5 wherein said test circuit contains an integrator which integrates the output signal of said ultrasonic transducer during a time window following said transmitting time interval, as well as an amplitude discriminator which compares the integration value furnished by said integrator to a threshold value which is dimensioned so that it is fallen short of when said ultrasonic transducer is covered by said liquid.

7. The assembly as set forth in claim 5 wherein said test circuit contains as sampling circuit which samples said output signal of said ultrasonic transducer at a point in time located after the end of said transmission time interval, as well as an amplitude discriminator which compares the sampled value furnished by said sampling circuit to a threshold value which is dimensioned so that it is fallen short of when said ultrasonic transducer is covered by said liquid.

8. The assembly as set forth in claim 5 wherein said energizing/analyzer circuit contains an envelope generator which receives the electrical output signals of said ultrasonic transducer and outputs an envelope signal representing the envelope of these output signals and wherein said sensing circuit and said test circuit are connected to the output of said envelope generator.

9. The assembly as set forth in claim 5 wherein said ultrasonic transducer contains a piezoelectric vibrator.

10. The assembly as set forth in claim 9 wherein said piezoelectric vibrator is accommodated in a housing, the bottom of which is configured as a diaphragm which is coupled to said piezoelectric vibrator by mechanical vibrations.

11. The assembly as set forth in claim 10 wherein an adapter film is inserted between said piezoelectric vibrator and said diaphragm.

12. The assembly as set forth in claim 11 wherein said piezoelectric vibrator consists of a porous piezo-crystal having the connectivity 3—3.

13. The assembly as set forth in claim 6 wherein said energizing/analyzer circuit contains an envelope generator which receives the electrical output signals of said ultrasonic transducer and outputs an envelope signal representing the envelope of these output signals and wherein said sensing circuit and said test circuit are connected to the output of said envelope generator.

14. The assembly as set forth in claim 7 wherein said energizing/analyzer circuit contains an envelope generator which receives the electrical output signals of said ultrasonic transducer and outputs an envelope signal representing the envelope of these output signals and wherein said sensing circuit and said test circuit are connected to the output of said envelope generator.

15. The assembly as set forth in claim 6 wherein said ultrasonic transducer contains a piezoelectric vibrator.

16. The assembly as set forth in claim 7 wherein said ultrasonic transducer constrains a piezoelectric vibrator.

17. The assembly as set forth in claim 8 wherein said ultrasonic transducer contains a piezoelectric vibrator.

* * * * *